Jan. 31, 1961  J. E. MARTENS  2,969,689

MOTION-TRANSMITTING DEVICE

Filed Sept. 22, 1958

INVENTOR.
JACK E. MARTENS

BY  G. D. McFadyen
W. E. Recktenwald
C. S. Penfold
ATTORNEYS

United States Patent Office 2,969,689
Patented Jan. 31, 1961

1

2,969,689

MOTION-TRANSMITTING DEVICE

Jack E. Martens, Gary, Ind., assignor to The Anderson Company, a corporation of Indiana Filed Sept. 22, 1958, Ser. No. 762,525

9 Claims. (Cl. 74—424.8)

This invention relates to a motion-transmitting device and more particularly to an improved stop for a freewheeling motion-transmitting device.

The invention relates, broadly, to a device for stopping rotation of the cage of a freewheeling-type nut assembly when the nut reaches a selected point on either end of its path of movement along a shaft. Such nut assemblies are commonly mounted on helically threaded shafts, the rotation of either the shaft or the assembly, while the other is restrained from rotation, causing relative axial movement between the shaft and assembly. The non-rotating part is operatively connected to a selected device so as to actuate said device, such as a reciprocably mounted carriage, or the window of a vehicle.

By the term "freewheeling" type nut assembly is meant a nut device so designed that upon inhibiting rotation of a certain part thereof, known in the art as the "cage," the nut or the shaft may continue to be rotated without developing any material axial thrust. In other words, the nut merely spins on the threaded shaft, or the shaft may simply spin in the nut. An early example of such an assembly is disclosed in the U.S. patent to Russel 2,446,-393; while The Anderson Company of Gary, Indiana, markets, under the trademark Roton, simpler and improved nut assemblies developed and patented by that company. One example of the Roton-type assembly is illustrated in the accompanying drawing.

The primary object of this invention is to provide for the purpose mentioned a stop having low inertia characteristics, thus to minimize the hammerlike noise heretofore emitted when the cage strikes the stop.

A further object is to provide a stop of the kind mentioned admitting considerable tolerance both in manufacture and orientation when installed.

A still further object is to provide a device of the kind mentioned which will yieldingly restrain both rotary and axial movement of the cage.

And a further object is to provide on a screw member a stop that is readily adjustable along the axis of the screw member without marking or damaging the threads of the screw.

In general, the foregoing objects are accomplished by installing a short helical, preferably wire, spring member on either end of the threaded shaft just short of the limit of travel selected for the nut. The wire is nested in the groove of a thread and has the outer extremity of the wire anchored to the shaft and has the opposite extremity thereof terminating in a short projection or abutment extending radially of the shaft. For anchoring the distal end of the spring to the shaft, I preferably encase a portion of the spring in a metal tube of less length than the spring, and crimp or indent the outer end of the tube onto and against the shaft and end of the spring.

Other objects and advantages of the invention will become apparent after the description hereinafter set forth is considered in conjunction with the drawing annexed hereto.

2

Figure 1:
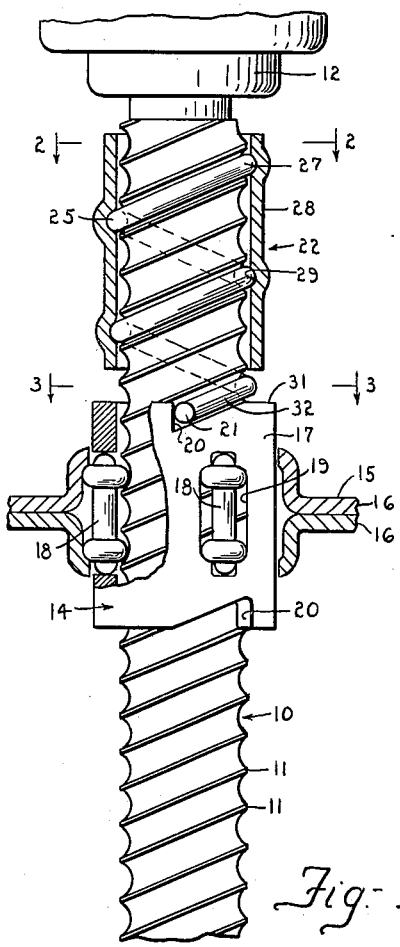
Figure 1 is a side view in elevation of my invention showing the improved stops mounted on the shaft.

Referring more particularly to the drawings wherein identical numerals indicate identical parts or assemblies, 10 designates a screw shaft, shown as being formed with multiple helical threads 11. The shaft is supported at either end in bearings 12, and is conventionally connected to be driven from a reversible power device or motor, not shown.

Operatively connecting with the shaft and engaging with the threads 11 is a well-known nut assembly 14 of the Roton-type above alluded to. The nut assembly 14 comprises a housing 15 surrounding the shaft (and here shown as made of two complementary parts 16 secured together), the tubular cage member 17 of metal, nylon, or other suitable material, rotatably positioned between the housing and shaft, and the several bearing elements 18, each element being rotatably mounted in an opening 19 formed in the cage.

It should be understood that upon rotation of shaft 10, assuming that housing 15 is inhibited from rotation, the nut assembly is moved along the shaft. In this situation, housing 15 is to be connected to a carriage, window, or other object to be moved. It is also common practice to rotatably mount the nut assembly and, by restraining rotation of the shaft, the latter will be moved axially upon rotation of the nut assembly.

An outstanding characteristic of the type of nut assemblies mentioned above is that, upon resisting or stopping rotation of the cage 17, the nut assembly will "freewheel"; that is to say, the shaft will rotate in the nut assembly, or, conversely, the assembly will simply spin on the shaft without any advancement of the nut assembly along the shaft. For stopping rotation of the cage 17, there is provided at either end of the cage 17 a notch 20 which is adapted to cooperate with an abutment 21 on a stop device 22 forming the subject matter of this invention.

As indicated, the structure outlined above is now more or less conventional. Heretofore, the stopping means for the cage has taken the form of a more or less fixed abutment, such as a pin fixed to the shaft or a disc or ring of considerable mass mounted, sometimes yieldingly, on the shaft. A serious objection to these prior stops lies in the fact that, in the case of the pins, the holes for the pins weakened the shaft, the pins were difficult to position accurately for proper stopping of the assembly, and the pins were inflexible making resetting of the pins along the shaft almost impossible. Equal difficulty has been experienced in the use of rings or discs, in that they were forcibly moved along the shaft, added inertia weight to the system, and were unyielding when struck by the nut assembly. Further, the impact stopping of the assembly sometimes caused injurious jamming and locking of parts of the nut assembly.

According to my invention, on either end of the shaft is installed a short helical, preferably wire, spring member 25 having two or three turns of the same pitch as the thread 11 of the shaft. The wire of spring 25 is preferably of a diameter to fit into the confines of the depth of the thread 11, and when the spring is in place, it snugly embraces the shaft. The end portion of the spring 25 next to the nut assembly 14 terminates in a short abutment 21 projecting radially outward from the shaft. Abutment 21 is so oriented as to enter notch 20 in the end of the cage 17 to stop rotation of the latter. The distal end 27 of spring 25 is attached or anchored with respect to shaft 10. In the broader aspect of the invention, the mode of attachment of end 27 to the shaft 10 may be by welding or other conventional expedient.

Figure 2:
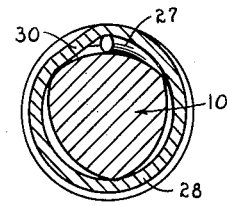
Figure 2 is a cross-sectional view taken along the lines 2—2 of Figure 1 showing one manner of securing the stop to the shaft.
Figure 3:
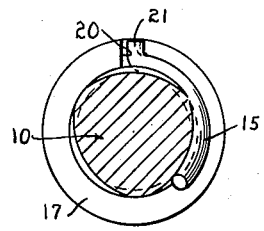
Figure 3 is a cross-sectional view taken along the lines 3—3 of Figure 1 showing the end of the stop in engagement with the cage.

I prefer, however, to employ the stop device 22 shown in Figures 1-3 wherein a metal tube 28 is telescopically seated over the spring 25 to clamp the spring to the shaft and to abut the distal end 27 against movement relative to the shaft. Tube 28 is of a shorter length than spring 25, and its inner wall is formed with a helical groove 29 corresponding to the pitch and size of wire from which spring 25 is formed. Tube 28 is of a diameter to be readily screwed onto spring 25, preferably with a slight degree of looseness between the radial sides of the spring 25 and tube 28. Once the tube 28 is properly positioned about the spring 25, the two are moved together along the spiral of the thread 11 until the abutment end 21 of the spring is properly oriented relative to the stop 20 on the cage 17. Once the end 21 is properly positioned relative to the stop 20 on the cage, the stop 20 will engage the end 21 every time the nut assembly travels to the appropriate end of its stroke. With the spring end 21 positioned relative to the shaft, the outer end of the tube 28 is crimped or indented as at 30 against the end 27 of spring 25 and against the thread on the shaft to clamp the spring 25 and tube 28 together, as shown in Figure 2.

As indicated, tube 28 preferably should be of slightly larger diameter than helical spring 25, and also terminate short of abutment 21 to permit the projecting portion 21 thereof to have unrestrained support for a short distance along the spring. In this way, the arrangement obviates many critical aspects usually found in orienting an abutment on the shaft. Thus, should abutment 21 happen to be in a retarded position relative to the cage 17 so that it will first engage the end 31 of the cage, for example, at a point a partial turn in advance of the inclined edge of stop notch 20, the resilience of the extended portion 32 of the spring will permit the abutment 21 to ride along the edge 31 of the cage until it finds its way into the stop notch 20.

A further action caused by contact between the cage 17 and spring end 21 relates to the axial length of the spring 25, which has small mass and inertia but considerable progressive resistance to distortion, and will absorb the impact shocks delivered to it by the cage in both a radial and an axial direction while reducing some of the noise incident thereto.

When the abutment 21 engages the stop 20 of the cage, force applied to abutment 21 will have a tendency to uncoil or expand spring 25. In the event substantial force is applied to abutment 21, the expansion of spring 25 will cause it to progressively uncoil from the abutment end along its length, and thus progressively engage and tighten in the groove 29 of tube 28, setting up a frictitonal drag and confining inwardly directed force therein. The tube 28 thus acts as a brake for the spring 25, increasing the braking action in proportion to the force applied.

Figure 4:
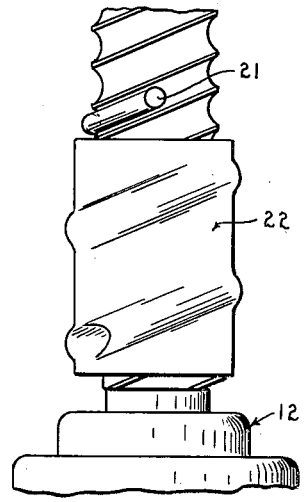
Figure 4 is a view similar to Figure 2, but illustrating a modified manner of clamping the stop to the shaft.

Figure 4 shows a modified form of attachment of the tube 28 and spring end 27 together and to the shaft 10. A small indentation 35 is formed in the side of the shaft 10 in such a way that when the tube 28 is crimped, as at 36, into the indentation 35 and past the distal end 27 of the spring 25, a more positive lock is secured which substantially prevents relative rotation between the tube 28 and the shaft 10. The operation of the stop 22 of Figure 4 is in all other respects identical with that of Figures 1-3.

Having thus described my invention, it is obvious that various modifications may be made in the same without departing from the spirit of the invention; and, therefore, I do not wish to be understood as limiting myself to the exact form, construction, arrangement, and combination of parts herein shown and described.

I claim:

1. In combination, a threaded shaft having a freewheeling nut assembly including a cage thereon; means carried by at least one end of the cage of the assembly to be engaged by a stop for inhibiting rotation thereof; a helical wire spring surrounding at least one end of said shaft; and a tube extending over and part way along said spring, the end of said tube away from said nut being deformed against said shaft and the end of said spring to secure the tube, shaft and spring together, the portion of the spring projecting from the tube terminating in an abutment for engagement with said means on the cage.

2. In combination, a threaded shaft having a freewheeling nut assembly of the type including a cage having means thereon to be engaged by a stop for inhibiting rotation thereof; a helical wire spring surrounding one end of said shaft and a tube extending over and part way along said spring, the end of said tube away from said nut being deformed against the shaft and the end of the spring to secure the tube, shaft and spring together, the inner wall of the tube being formed with a helical groove of a pitch corresponding to and receiving said spring, the portion of the spring projecting from the tube terminating in an abutment for engagement with said means on the cage.

3. A stop means for a cage of a freewheeling nut assembly mounted on a helically threaded shaft, said stop means comprising a short helical wire spring fitted onto the thread of said shaft adjacent a point selected for termination of relative axial travel between the nut assembly and shaft, the pitch of said spring and the diameter of the wire of which it is formed corresponding respectively to the pitch and depth of the thread of said shaft, the distal end of said spring being fixedly anchored to said shaft, and abutment means on the end of the spring facing the nut assembly, said abutment means being oriented to encounter other abutment means on a end of the cage.

4. The device as defined in claim 3 wherein the free end of the spring terminates in a short, bent portion projecting radially with relation to the shaft and defining said abutment means.

5. In combination with a threaded shaft and a freewheeling nut assembly thereon for effecting relative axial travel between the shaft and the nut assembly, said assembly including a cage, means formed on at least one end of the cage to be engaged by an abutment to inhibit rotation thereof, and a helical spring fitted onto at least one end of said shaft, the distal end of said spring being secured to said shaft, the opposite end of said spring being bent outwardly radially of the shaft and forming said abutment oriented for engagement with the means on said cage.

6. In combination with a threaded shaft and a freewheeling nut assembly thereon for effecting relative axial travel between the shaft and the nut assembly, said assembly including a cage having at one end means to be engaged by an abutment, a helical spring on and surrounding one end of said shaft, the distal end of said spring being secured to said shaft, the opposite end of said spring being bent outwardly radially with respect to the shaft and forming an abutment oriented for engagement with the means on said cage, and means encircling said spring throughout a substantial portion of its length and anchoring the distal end of the spring to the shaft.

7. In combination, a helically threaded shaft formed at one end with a noncircular portion and having a nut assembly including a cage threaded thereon, said cage being provided at one end with means to be engaged by an abutment to inhibit turning thereof, a short helical wire spring fitted onto the thread of said shaft adjacent a point selected for termination of relative axial travel between the nut assembly and shaft with one end of the spring contiguous to said noncircular portion, the pitch and diameter of said spring corresponding respectively to the pitch and depth of the thread of said shaft, said spring resting in said thread, and a tubular member of less length than said spring and having a helical groove along its inner wall corresponding to the pitch and diameter of said spring, said tubular member being fitted onto said spring with the distal end of the member terminating over said noncircular portion of the shaft and being swaged against said noncircular portion and the contiguous end of the spring, the opposite end of the spring projecting beyond the end of the member and being formed with said abutment oriented for engagement with the means on said cage.

8. The apparatus as defined in claim 7 wherein the noncircular portion comprises a flat, and the end of the tubular member is indented into contact therewith.

9. The apparatus of claim 7 wherein the tubular member loosely engages said spring, whereby when force is applied to the abutment end of the spring it will tend to progressively uncoil the spring and progressively effect braking action between the spring and tubular member.

References Cited in the file of this patent

UNITED STATES PATENTS

| | | |
|---|---|---|
| 1,252,579 | Johnson | Jan. 8, 1918 |
| 2,715,341 | Hogan | Aug. 16, 1955 |
| 2,837,930 | Desmond | June 10, 1958 |
| 2,837,931 | Brundage | June 10, 1958 |
| 2,844,969 | Lohr | July 29, 1958 |
| 2,857,776 | Williams et al. | Oct. 28, 1958 |